or Feb. 27, 1962

3,023,225
PREPARATION OF GLYCIDYL POLYETHERS OF POLYHYDRIC PHENOLS

Norman H. Reinking, Millington, N.J., assignor to Union Carbide Corporation, a corporation of New York
No Drawing. Filed July 18, 1957, Ser. No. 672,560
9 Claims. (Cl. 260—348.6)

This invention relates to the preparation of glycidyl polyethers of polyhydric phenols. More specifically this invention relates to a process for preparing glycidyl polyethers of polyhydric phenols containing as the principal product the monomeric glycidyl polyether of said phenols.

Glycidyl polyethers of polyhydric phenols have usually been prepared by reacting epichlorohydrin with a polyhydric phenol in the presence of an alkali catalyst. Illustrative of such a reaction, epichlorohydrin reacts with bis (4-hydroxy phenyl) dimethylmethane, commonly known as Bisphenol A, in the presence of an alkali catalyst to form, in addition to polymeric reaction products, the monomeric glycidyl polyether of bis (4-hydroxy phenyl) dimethylmethane. This reaction may be represented by the following equation.

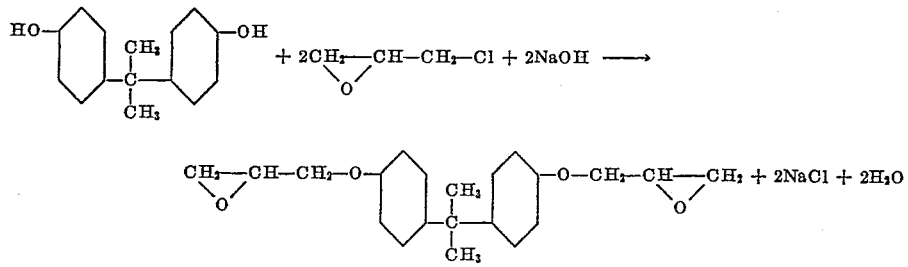

According to this equation, one mole of epichlorohydrin is required for reaction per each phenolic hydroxyl group. It has been found, however, that if these ratios are employed, the yield of the monomeric glycidyl polyether would be exceedingly small, at most about 10% by weight of the reaction product.

The reaction product would comprise essentially high molecular weight polymers containing 2 or more aromatic hydrocarbon radicals alternating with glyceryl groups which are connected therewith through ether oxygen atoms. For example, when 2 moles of epichlorohydrin are reacted with one mole of a polyhydric phenol such as Bisphenol A, the reaction product comprises essentially a polymer having the following general formula:

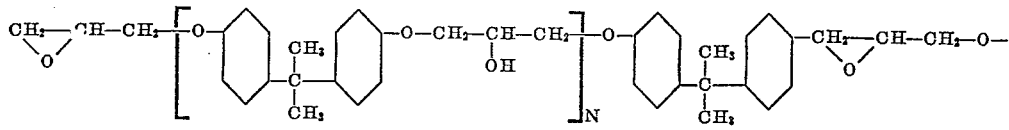

where N has a value of 1 to 20.

I have now discovered a new and novel process for preparing glycidyl polyethers of polyhydric phenols which contain as the principal product the monomeric glycidyl polyether of said phenol. My process affords a method by which there is obtained a monomeric glycidyl polyether content of as high as 87% by weight based on the weight of the reaction product.

My new and novel process also affords a method whereby substantially 100% of the unreacted epichlorohydrin is recovered. The process is also advantageous, therefore, from a commerical standpoint as practical economics of preparing glycidyl polyethers of polyhydric phenols dictates that the unreacted epichlorohydrin be recovered and recycled for subsequent reaction with additional phenol.

My invention is based on the discovery that the yield of monomeric glycidyl polyethers is unexpectedly increased by conducting the overall etherification reaction in two stages, in the first stage admixing the epichlorohydrin and the polyhydric phenol in the presence of a catalytic amount of a lithium compound and in the presence of between 0.001 and 1% by weight of water, whereby the phenol and epichlorohydrin react to form the corresponding chlorohydrin ethers; and in the second stage dehydrochlorinating the chlorohydrin ethers to form a reaction product containing as the principal product the monomeric glycidyl polyether.

The first stage reaction is carried out in the presence of between .001 and 1% by weight water and in the absence of organic hydroxylated compounds other than the polyhydric phenols.

It is believed that the following reactions occur during the first stage coupling reaction as typically illustrated by the following equations wherein MX is a lithium chloride catalyst and R—OH is a fragment of a polyhydric phenol.

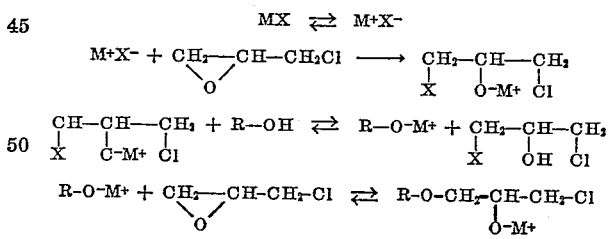

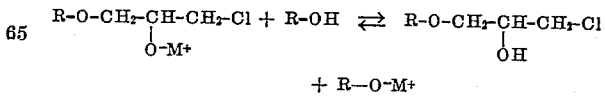

$+ R{-}O{-}M^+$

According to these equations the phenoxide intermediate is continuously regenerated and the process repeated until all of the phenolic hydroxyl groups have reacted with the epichlorohydrin.

The second stage reaction may be typically illustrated by the following equation.

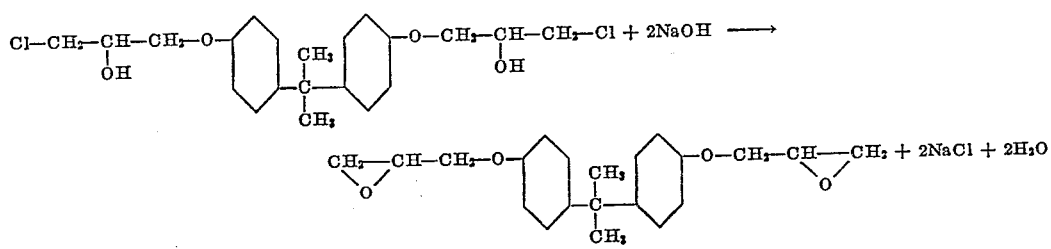

As indicated by these equations, my process eliminates the substantial formation of undesirable polymerization and condensation products and leads to the production of low viscosity glycidyl polyethers containing as the principal product the monomeric glycidyl polyether.

As has been previously stated, lithium compounds have been found most suitable as coupling catalysts. Their greater coordinating capacity tends to prohibit their forming ionic complexes. This characteristic favors the reaction of the β-chloroalkoxide anion intermediate through reaction (α) rather than through reaction (β) as shown below wherein epichlorohydrin and bis (4-hydroxyphenyl)dimethylmethane are the reactants and M+ the lithium ion.

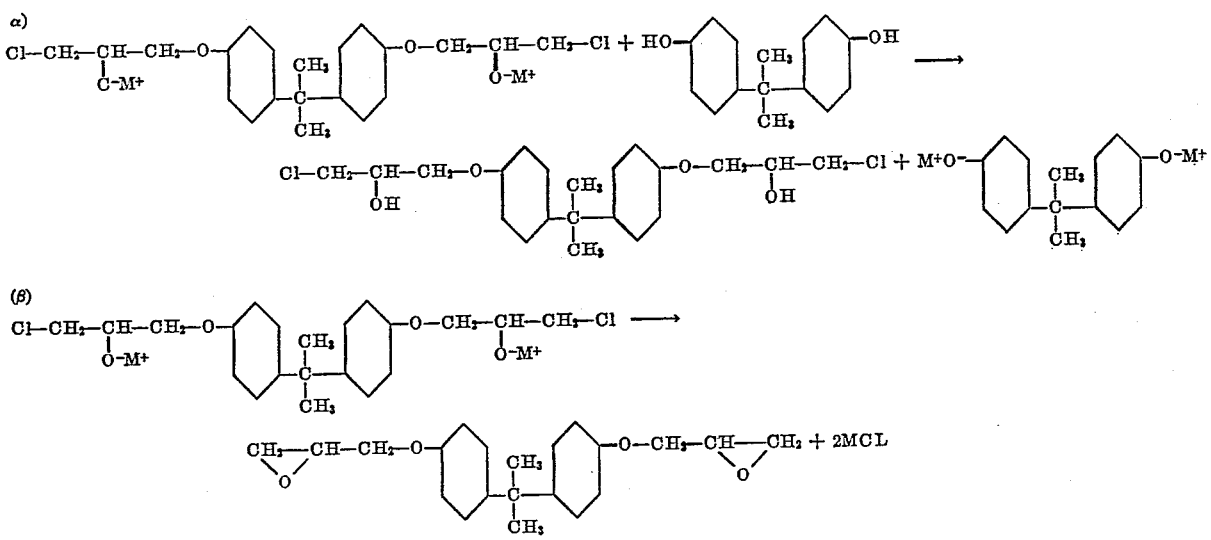

By favoring reaction α over reaction β, premature formation of epoxides, which leads to high molecular weight condensation products is minimized and also neutralization of the catalyst is avoided. The lithium catalyst therefore remains available in the organic reaction medium and catalyzes the coupling reaction essentially to completion. Furthermore, the lithium catalyst does not incorporate into the glycidyl polyether product and may be easily removed from the reaction medium after the completion of the coupling reaction.

The lithium compounds which are preferred as coupling catalysts are the inorganic and organic salts, illustrative of which are lithium chloride, lithium bromide, lithium iodide, lithium naphthenate, lithium acetate, lithium propionate, lithium butyrate, and also lithium hydroxide, and lithium oxide. The concentration of the lithium catalyst should be sufficient at least to color phenolphthalein. Preferably, the lithium compounds are employed in concentrations of between 0.01 and 0.07 mole per each phenolic hydroxyl group.

A concentration of less than about 0.01 mole per each phenolic hydroxyl group causes the reaction to proceed sluggishly. Increasing the concentration tends to increase the rate of reaction. However, a concentration in excess of about 0.07 mole per each phenolic hydroxyl group, although increasing to some extent the speed of the reaction, is unsound from an economical standpoint and also presents problems of handling and eliminating the relatively large amounts of catalyst from the reaction system. As heretofore pointed out, the stage I coupling reaction wherein a polyhydric phenol is reacted with epichlorohydrin is conducted in the presence of between 0.001 and 1% by weight water based on the total weight of the components in the system and in the absence of other hydroxylated organic compounds. The reaction medium is kept free of hydroxylated organic compounds other than the polyhydric phenols because epichlorohydrin reacts with these compounds according to the following equation as typically illustrated by the reaction of epichlorohydrin and ethanol.

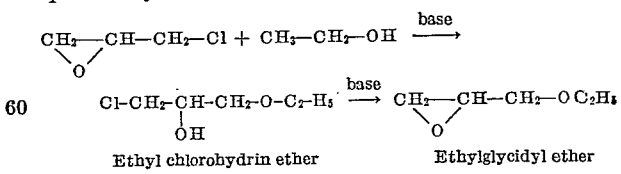

Ethyl chlorohydrin ether      Ethylglycidyl ether

These products, typified by ethylglycidyl ether, are difficult to separate from the unreacted epichlorohydrin. For example, ethylglycidyl ether boils at 126° C., near the boiling point of epichlorohydrin (117° C.). In distilling off the unreacted epichlorohydrin prior to the dehydrohalogenation step, any ethylglycidyl ether which has formed is distilled off along with the epichlorohydrin. On recycling the epichlorohydrin distillate for reaction with additional phenol, the ethyl glycidyl ether undergoes a reaction when the phenol to give an undesirable non-epoxy terminated product as illustrated by the following equation wherein the phenol is bis (4-hydroxyphenyl) dimethylmethane.

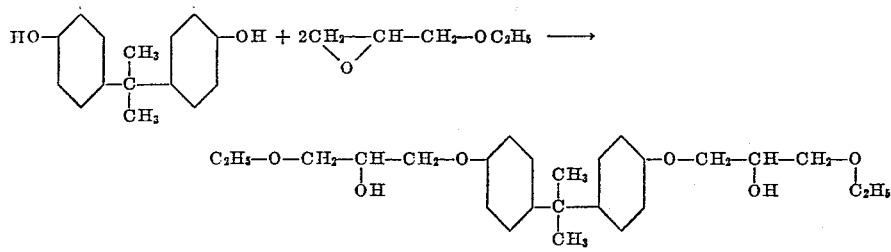

Other hydroxylated organic compounds undergo similar reactions.

The non-epoxy terminated product increases the epoxy equivalent weight of the final product. The functionality of the product is also impaired and is manifested by a lower heat distortion value and hot flexural strength when the product is reacted with standard hardening agents.

While a small quantity of water is necessary for the lithium compound to function as a catalyst, nevertheless the amount of water should not be in excess of 1% by weight based on the weight of the components present in the first stage reaction. Water in excess of 1% by weight in the first stage of the reaction separates out as a distinct phase near the end of the coupling reaction. In separating out as a distinct phase, the water extracts substantial amounts of the coupling catalyst from the organic reaction medium, thus hindering the reaction between the epichlorohydrin and the polyhydric phenol. Sufficient water is added, however, to facilitate introducing and maintaining the lithium catalyst into the organic reaction medium.

It is necessary for my invention that there be present a minimum of at least .001% by weight of water, in order that the lithium compound function as an effective catalyst. The lithium compound is preferably dissolved or slurried in the water and then introduced in the organic reaction medium. When a lithium catalyst other than lithium chloride is used, the following reactions occur as typically illustrated by the following equations wherein

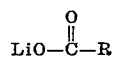

represents an organic soluble lithium salt such as lithium naphthenate and R—OH represents a fragment of a polyhydric phenol.

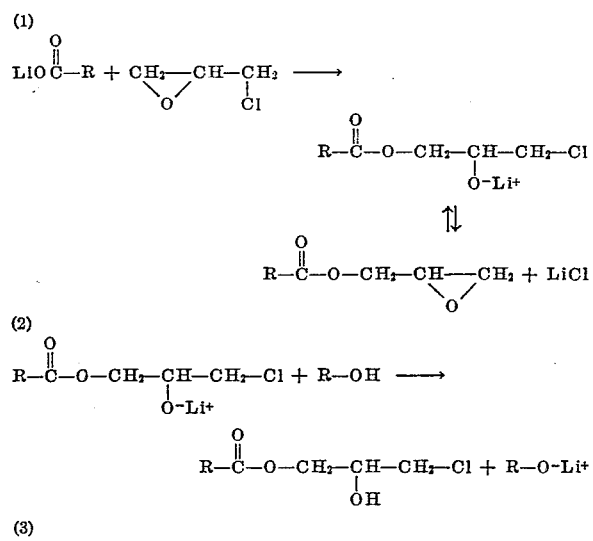

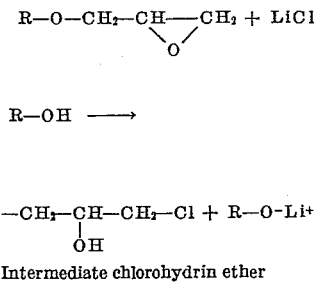

As indicated by the foregoing equations the lithium compound reacts with epichlorohydrin to form an alkoxide intermediate which is in equilibrium with the corresponding epoxide derivative and lithium chloride as indicated in Equation No. 1. The alkoxide intermediate in turn reacts with the polyhydric phenol generating the phenoxide ion (Equation No. 2) which then reacts with the epichlorohydrin, as shown in Equation No. 3; to form the second alkoxide intermediate. This second alkoxide intermediate is also in equilibrium with the corresponding glycidyl ether and lithium chloride as shown in Equation No. 3. Regardless of the initial lithium compound introduced into the system, therefore, lithium chloride is formed in the reaction. Sufficient water i.e. 0.001% by weight must be present in order to maintain the lithium chloride in the organic layer, thus insuring the formation of the alkoxide intermediates which catalyze the coupling reaction.

The first stage coupling reaction is conducted at temperatures not exceeding about 60° C. Temperatures in excess of about 60° C. lead to excessive formation of undesirable polymeric compounds. Temperatures of about 40° C. or lower have been found most suitable since at these temperatures better yields and better quality glycidyl polyethers are obtained. The lower the temperature, however, the longer is the reaction time necessary for the first stage coupling to occur. For example, at room temperature about 25° C., the reaction time is 90 hours.

The present process insures a practically quantitative coupling of the epichlorohydrin and the polyhydric phenol. Moreover, by effecting a quantitative coupling in Stage I to form the monomeric chlorohydrin ether to the substantial exclusion of undesirable condensation and polymerization products, the unreacted epichlorohydrin may be easily removed before proceeding to the dehydrochlorination stage.

Apart from the practical economic considerations for recovering unreacted epichlorohydrin, it is also necessary that the epichlorohydrin be recovered prior to the dehydrochlorination stage for if present in that stage the epichlorohydrin will react with the aqueous alkali solution to form such heat sensitive compounds as glycidol, as shown in the following equation.

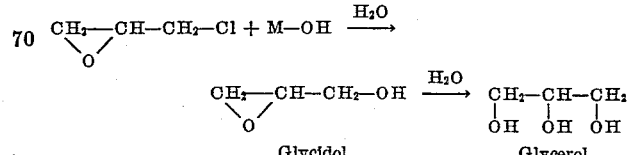

The glycidol is sensitive to heat, forming undesirable polymerization products which remain in the polyethers, increasing their viscosity.

The unreacted epichlorohydrin is usually removed from the intermediate chlorohydrin ether reaction product using conventional low pressure, short contact time distillation techniques. After removal from the reaction medium, the distillate containing the epichlorohydrin, is treated with sodium hydroxide or lime to convert any glycerol dichlorohydrin which may have formed, to epichlorohydrin. The epichlorohydrin is thereafter used for reaction with additional quantities of the polyhydric phenol.

Preferably the glycerol dichlorohydrin is first separated from the epichlorohydrin and then treated with the caustic or lime. Adding the caustic or lime directly to the glycerol dichlorohydrin-epichlorohydrin mixture causes some destruction of the epichlorohydrin.

Following the removal of the unreacted epichlorohydrin and glycerol dichlorohydrin from the intermediate chlorohydrin ether product, the product is dehydrohalogenated by adding thereto more than a stoichiometric amount of base. An excess of base is added in order to complete the dehydrochlorination of the intermediate ether product. As much as 20% in excess of the stoichiometric amount may be added with good results. It is preferred, however, to add 5% in excess of the stoichiometric amount. A stoichiometric excess of about 5% will completely dehydrohalogenate the intermediate chlorohydrin ethers and will not attack and destroy the glycidyl polyethers which are formed. The dehydrochlorination reaction is an equilibrium reaction and may be illustrated by the following equation wherein the intermediate chlorohydrin ether product has been formed by reacting epichlorohydrin with Bisphenol A.

other hand, if only a water-insoluble solvent were used, the rate of dehydrochlorination would be too slow to be practical.

The ratio of water-soluble solvent to water-insoluble solvent may be varied between about 1:1 and 3:1 ratio by weight.

The concentration of the aqueous caustic solution is preferably about 18%. If a solution of a higher concentration were used, the sodium chloride formed in the dehydrochlorinating step would precipitate out of the water phase. The salt precipitate would clog the apparatus and would necessitate a series of steps to eliminate the precipitate from the system.

I have also found it advantageous to add the caustic in the continuous dehydrochlorination step in two stages. Usually, 75% of the total amount of caustic is added in the first stage and the remainder added in the second stage. Each addition of caustic is followed by a settling and decantation step in order to eliminate the brine layer containing the formed sodium chloride. If the lithium catalyst has not been previously separated from the system, it will also be eliminated upon decantation of the brine layer as the catalyst dissolves in the brine layer. The two stage addition of aqueous caustic is advantageous for two primary reasons: (1) to prevent damage to the intermediate ether product which would occur as a result of a single addition of the caustic and (2) to enable a removal of the brine solution from the organic reaction medium after each addition of caustic in order to insure that the dehydrochlorination reaction proceeds to completion.

The speed of the dehydrochlorination reaction depends to a large extent on the temperature. It is preferred to conduct the dehydrochlorination reaction at temperatures between about 40–70° C. At these temperatures, the density of the organic phase and water phase is such

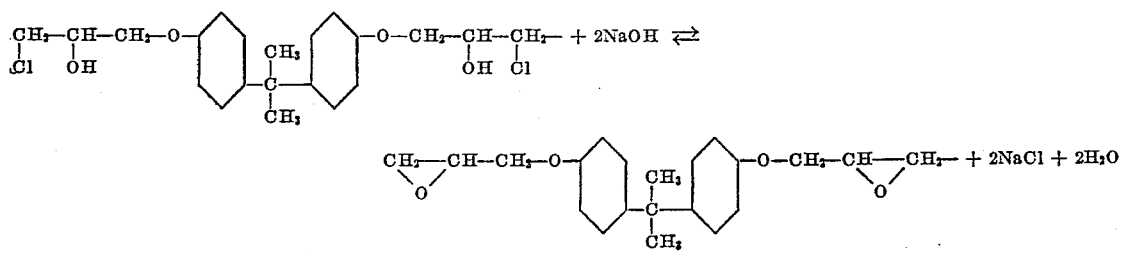

As previously pointed out in order to drive the reaction essentially to completion to the right it is necessary to add an excess of the stoichiometric amount of caustic required for dehydrochlorination.

Among the dehydrochlorinating compounds may be mentioned sodium hydroxide and potassium hydroxide.

The dehydrochlorination of the intermediate chlorohydrin ethers is accomplished by a continuous process wherein the intermediate ether product is solvated with an organic solvent and thereafter dehydrochlorinated by the addition thereto of more than the stoichiometric amount of caustic. The organic solvent is preferably a mixture of solvents comprising (1) a volatile, water soluble alcohol or ketone, such as methanol, ethanol, isopropanol, butanol, acetone and dioxane, which is a solvent for the intermediate chlorohydrin ethers and caustic and (2) a hydrocarbon or ether, for example, toluene, xylene and isopropyl ether which is relatively insoluble in water but which is a solvent for the glycidyl polyethers.

Using a mixture of water soluble and water insoluble solvents as the medium in which the intermediate chlorohydrin ethers are dehalogenated precludes the base from attacking the glycidyl polyethers after they are formed. If only a water-soluble solvent were used there would be formed a completely homogeneous system in which the base would readily attack the glycidyl polyethers to produce hydrolyzed or polymerized by-products. On the that there is a clear separation of the two phases into two layers. The two phases may therefore be separated by a simple decantation operation.

Following the final addition of caustic and after the separation of the organic and brine layers, the organic layer is subjected to a separation step, usually an evaporation process, whereby the organic solvents are driven off, recovered and recycled to the solvation stage and the glycidyl polyethers are recovered.

The polyhydric phenols suitable for reaction with epichlorohydrin according to the present invention include the mononuclear polyhydric phenols such as resorcinol and pyrogallol, the di- or polynuclear phenols such as the bisphenols described in the Bender et al. United States Patent 2,506,486 and the polyphenylols such as the novalak condensation products of a phenol and a saturated or unsaturated aldehyde containing an average of from 3 to 20 or more phenylol groups per molecule (cf. book by T. S. Carswell, Phenoplasts, published in 1947 by Interscience Publishers of N.Y.). Exemplary of suitable polyphenylols derived from a phenol and an unsaturated aldehyde such as acrolein are the triphenylols, pentaphenylols and heptaphenylols, described in copending application Serial No. 368,514, filed July 16, 1953, by A. G. Farnham, now U.S. Patent 2,885,385 and copending application Serial No. 422,275, filed August 9, 1954, also by A. G. Farnham, now U.S. Patent 2,801,987.

The phenols may contain alkyl, aryl, or halogen ring substituents. These compounds are exemplified by the alkyl resorcinols, the tribromo resorcinols and the substituted diphenols of the Bender et al. Patent 2,506,486.

The polyhydric polynuclear phenols may consist of two or more phenols connected by such linking groups as an alkylene group, alkyl substituted alkylene group, a sulfone group and the methylene group. The linking groups are further exemplified by compounds having the following general formulas:

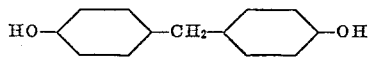

Bis (4-hydroxy phenyl) methane

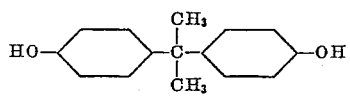

Bis (4-hydroxy phenyl) dimethylmethane

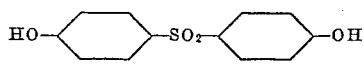

Dihydroxy diphenyl sulfone

A trisphenol having the formula:

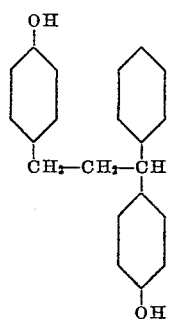

A tetraphenol having the formula:

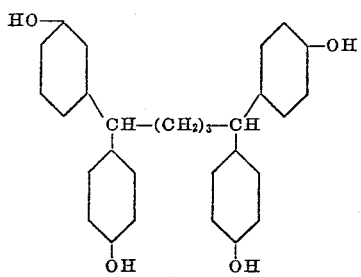

The epihalohydrin used in the present invention is epichlorohydrin. An excess of the stoichiometric amount of epichlorohydrin is used, at least 3 moles of epichlorohydrin per each phenolic hydroxyl group. The amount of epichlorohydrin is dependent in part on the coupling catalyst used and the reaction temperature. For example, 0.07 mole of a lithium chloride catalyst and 6 moles of epichlorohydrin were used per mole of Bisphenol A at a reaction temperature of 40° C. and time of reaction 50 hours.

Generally my process is conducted by admixing a polyhydric phenol with at least three moles of epichlorohydrin per each phenolic hydroxyl group in the presence of a lithium catalyst. It is preferred to introduce the lithium catalyst into the reaction medium in an aqueous form. For example, in introducing 0.07 mole of lithium chloride into a reaction medium containing one mole of bis-(4-hydroxy phenyl)-dimethylmethane and 6 moles of epichlorohydrin, the lithium chloride is first dissolved in 0.39 mole of water and then added to the reaction medium. Using the reactants in the amounts noted, the mixture is heated to a temperature of about 40° C. The time for substantially complete coupling of the polyhydric phenol and epichlorohydrin at 40° C. is approximately 50 hours. At room temperature the time of reaction is about 90 hours. The progress of the first stage coupling reaction can be determined by an epoxy analysis of the unreacted epichlorohydrin and also by an ultraviolet spectrophotometric analysis by which the percent of unreacted phenolic hydroxyl groups is measured. The completion of the coupling reaction is indicated by the substantial absence of phenolic hydroxyl groups. The mixture comprising the coupled chlorohydrin intermediate, some preformed glycidyl ether, unreacted epichlorohydrin, glycerol dichlorohydrin, water and lithium catalyst may at this point be filtered in order to separate out and recover the lithium catalyst. The filtering step is advantageous as solids are eliminated which tend to clog the metering devices of the apparatus. If not recovered by this filtration step, the catalyst dissolves in the brine layer which is formed in the dehydrochlorination step and is removed from the system along with the brine. The unreacted epichlorohydrin and glycerol dichlorohydrin are distilled off and separated. The dichlorohydrin is then treated with caustic or lime to convert it to epichlorohydrin.

The dehydrochlorination of the intermediate chlorohydrin ethers is conducted in a continuous process. The intermediate chlorohydrin ethers are solvated by a liquid comprising a mixture of water-insoluble and water-soluble solvents, for example toluene and ethanol. Usually the solvents are used in mixtures ranging between 1:1 and 3:1 parts by weight of water-insoluble solvents to water-soluble solvents and in amounts such that a 45% solution with respect to the chlorohydrin ethers is formed.

In lieu of toluene, xylene or isopropyl ether may be used and either methanol, isopropanol, butanol, acetone or dioxane may be used in place of the ethanol.

After the intermediate chlorohydrin ethers are solvated, they are dehydrochlorinated in a two step process by the addition thereto of an 18% aqueous caustic solution. Initially 75% of the total caustic is added. This addition forms a two phase mixture comprising an organic phase and brine phase which contains the formed sodium chloride. The brine phase is separated from the organic phase and the organic phase is treated with the rest of the aqueous caustic. All told, an excess of the stoichiometric amount of caustic required for complete dehydrohalogenation is added.

The organic phase containing the crude diglycidyl ether product is again separated from the brine layer after the second addition of caustic. The organic phase thereafter is subjected to a distillation operation under reduced pressures and at a temperature sufficient to drive off the organic solvents from the crude diglycidyl ether product. The solvents are recovered and recycled to the solvation stage. The residue containing approximately 95% solids is finally stripped under a vacuum at a material temperature of 150° C. The residue constitutes the desired glycidyl polyether product.

The analysis for the epoxy group content of the product is based upon the reaction of an epoxide sample with pyridine hydrochloride to form pyridine and the corresponding chlorohydrin of the epoxide. The analysis can be performed by introducing into a pressure bottle containing 25 ml. of 1 N pyridine hydrochloride in pyridine, an amount of epoxide sample calculated to react with about 50% of the pyridine hydrochloride. The bottle is then sealed and the contents heated in a steam bath for a period of one hour. At the end of this time the bottle and contents are cooled and 10 drops of phenolphthalein indicator added (1.0 gram per 100 ml. of 60% ethanol). The mixture is titrated to a permanent red end point with a standard 0.2 N alcoholic KOH solution. A blank is also run in precisely the same fashion without, however, the inclusion of a sample. From the titration data obtained, the amount of pyridine hydrochloride consumed by reaction with the epoxide sample can be calculated and from this the epoxide content can be determined.

The epoxide content is usually expressed in terms of epoxide equivalency which is the grams of resin containing one gram-mole of epoxide. Based on the "epoxy equivalency," the yield of the monomeric glycidyl polyether expressed as percent by weight of the total weight of the product obtained is easily calculated.

In determining the heat distortion value and flexural strength, the product is first hardened by admixing with 4,4'-methylene dianiline, curing at 85° C. for 20 hours, and then annealing for 3 hours at 160° C. Sufficient quantity of hardener, 4,4'-methylene dianiline, is used to provide one equivalent of epoxy per each amino hydrogen. The heat distortion value using ASTM No. D–248–45T and the flexural strength of the product using ASTM No. D–790–49T was thereafter determined.

The following examples further illustrate this invention without in any way limiting its scope.

*Example I*

One mole of a bis(4-hydroxy phenyl)dimethylmethane was admixed with 6 moles of epichlorohydrin; the temperature of the mixture was maintained at 35° C. The lithium chloride catalyst was introduced into the mixture in aqueous solution which was prepared by dissolving 0.07 mole of LiCl in .39 mole of water. The temperature was increased to 40° C. and maintained at this level for a period of 55 hours. At the end of this time the amount of unreacted phenol as indicated by an ultra violet spectrophotometric analysis was 0.35% of the starting phenolic material. This corresponded to a minimum coupling efficiency of 98.8%.

The mixture comprising the coupled chlorohydrin intermediate, some preformed glycidyl ether, unreacted epichlorohydrin, glycerol dichlorohydrin, water and precipitated lithium chloride was filtered in order to separate out the lithium chloride.

A charge of 30,000 pounds of the precoupled chlorohydrin ether product was prepared in the manner described above and run into a 10 sq. ft. cocurrent turbulent evaporator at the rate of 246.5 lbs. per hour. The temperature of the feed material in the evaporator was kept at 130° C. under a pressure of 25 mm. of mercury. The unreacted epichlorohydrin and glycerol dichlorohydrin were stripped from the chlorohydrin ether product at this point at the rate of 125.5 lbs. per hour. The epichlorohydrin and glycerol dichlorohydrin were separated and the glycerol dichlorohydrin treated with lime or caustic. This treatment converted the glycerol dichlorohydrin to epichlorohydrin which was thereafter recycled for reaction with additional phenol.

The residue from the cocurrent turbulent evaporator was fed to a tank at 128 lbs. per hour where it was solvated in a mixture of toluene and ethanol. The rate of feed of the toluene-ethanol mixture was 121 lbs. per hour. The toluene-alcohol mix prior to being fed into the solvation line mixer had been subjected to a refractive index analysis by which the alcohol content of the mix was determined. The solvated product was fed into a cooling tank at the rate of 121 lbs. per hour and cooled to a temperature of about 35° C. From the cooling tank the product was fed at the rate of 121 lbs. per hour to a tank where the toluene-alcohol ratio was adjusted to 70 parts of toluene per 30 parts of ethanol. Further additions of solvent were made at this point to adjust the solids to solvent ratio to 45:55. The rate of feed of makeup toluene and ethanol into the feed mix preparation tank was 4.1 lbs. per hour with respect to the toluene and 6.4 lbs. per hour for ethanol. From the adjusting tank the solution was fed into two overflow reactors at an average rate of 257.4 lbs. per hour. In these reactors the solution was treated with a caustic solution having a concentration of 18% by weight of sodium hydroxide. Sufficient caustic was added to provide an excess of 5% of the stoichiometric amount required for complete dehydrochlorination of the intermediate chlorohydrin ethers.

Seventy-five percent of the total caustic was added to the first reactor at the rate of 82.5 lbs. per hour. The remaining caustic was added to the second reactor at the rate of 27.5 lbs. per hour. After each addition of caustic the material was fed into a holding tank and then into a decantation tank where the brine layer was separated from the organic layer. The dehydrochlorination was carried out at a temperature of about 55° C.

Inasmuch as some alcohol was decanted with the brine layer in the first decantation step, additional alcohol was added to the second overflow reactor at the rate of 16 lbs. per hour. The addition maintained the toluene-alcohol ratio at about 3:1.

The brine layer containing sodium chloride and dissolved alcohol was treated by a simple "topping" distillation whereby the alcohol was recovered. The brine was discarded. Following the second addition of caustic and separation of the brine layer from the organic layer, the organic layer containing the crude glycidyl polyethers was fed to a forced circulation evaporator which was operated at temperatures sufficient to provide a material temperature of 120° C. and at a pressure of 200 mm. of mercury. The solvents which were stripped from the glycidyl polyethers in this step were recycled back to the solvation stage at the rate of 128 lbs. per hour. From the forced circulation evaporator the glycidyl polyethers were fed to a turbulent film evaporator at 236.0 lbs. per hour where the material was finally stripped at a pressure of 30 mm. of mercury and at a material temperature of 150° C. to the final product.

The stripped glycidyl polyethers had an epoxy equivalency of 186, a viscosity of 9000 centistokes and a color on the Gardner scale of 5. Based on the epoxy equivalency the content of monomeric glycidyl ether present in the product was calculated as 81.3% by weight of the total weight of the product. The remaining product comprised essentially high molecular weight polymers. The amount of unreacted epichlorohydrin recovered was 100%.

The glycidyl polyether product in admixture with 4,4'-methylene dianiline as a hardener cured to a product having a heat distortion value of 163° C. The flexural strength of the cured product as room temperature was 17,200 p.s.i.; at 132° C., 8400 p.s.i.

*Example II*

One mole of bis(4-hydroxy phenyl)dimethylmethane and 6 moles of epichlorohydrin were admixed in the presence of a water solution of lithium chloride prepared by dissolving 0.07 mole of lithium chloride in 0.39 mole of water. The mixture was heated at 40° C. for 50 hours whereby the phenol and epichlorohydrin reacted to form the intermediate chlorohydrin ethers. The product was thereafter treated as described in Example I wherein the evaporation of the chlorohydrin ethers to recover the unreacted epichlorohydrin was conducted at a material temperature of 140° C. under a pressure of 10 m.

The glycidyl polyether product had an epoxy equivalency of 180, a viscosity of 7700 and a color on the Gardner scale of 6.

Based on the epoxy equivalency the content of monomeric glycidyl polyether was calculated as 87.3 by weight of the total weight of the product. The remaining product was comprised essentially of high molecular weight polymers. The amount of unreacted epichlorohydrin recovered was 98%. The heat distortion value of the product, cured with 4,4'-methylene dianiline, was 166° C.; its flexural strength at room temperature was 17,400 p.s.i.; at 132° C. the flexural strength was 8100 p.s.i.

*Example III*

One mole of bis(4-hydroxy phenyl)dimethylmethane was admixed with 6 moles of epichlorohydrin in the presence of an aqueous lithium chloride solution prepared by dissolving 0.07 mole of lithium chloride in 0.39 mole of water. The temperature of the mixture was maintained at 40° C. for 55 hours. The intermediate chlorohydrin ethers formed were treated as described in Example I wherein the evaporation to recover the unrecycled epichlorohydrin was conducted at a material temperature of 150° C. under 1 mm. pressure.

The glycidyl polyether product had an epoxy equivalency of 184, a viscosity of 11,000 and a color on the Gardner scale of 5. Based on the epoxy equivalency, the content of monomeric glycidyl polyether was calculated as 83.3%. The remaining product comprised essentially of high molecular weight polymers. Amount of unreacted epichlorohydrin recovered was 98%. The heat distortion value of the product, cured with 4,4'-methylene dianiline was 160° C. The flexural strength of the cured product was 17,200 p.s.i. at room temperature and 8400 p.s.i. at 132° C.

*Example IV*

One mole of bis(4-hydroxy phenyl)dimethylmethane was admixed with 8 moles of epichlorohydrin in the presence of an aqueous lithium chloride solution prepared by dissolving 0.07 mole of lithium chloride in 0.39 mole of $H_2O$. The temperature of the mixture was maintained at 40° C. for 55 hours whereby the phenol and epichlorohydrin reacted to form the intermediate chlorohydrin ethers. The product was thereafter treated as described in Example I wherein the evaporation of the chlorohydrin ethers to recover the unreacted epichlorohydrin was conducted at a material temperature of 150° C. under a pressure of 1 mm.

The glycidyl polyether product had an epoxy equivalency of 188, a viscosity of 10,400 and a color on the Gardner scale of 5. Based on the epoxy equivalency the content of monomeric glycidyl polyether was calculated as 79.3%. The remaining product comprised essentially of high molecular weight polymers. The amount of unreacted epichlorohydrin recovered was 96.6%. The heat distortion value of the product, cured with 4,4'-methylene dianiline, was 158° C. The flexural strength of the cured product was 16,600 p.s.i. at room temperature and 7700 p.s.i. at 132° C.

*Example V*

One mole of bis(4-hydroxy phenyl)dimethylmethane was admixed with 10 moles of epichlorohydrin in the presence of an aqueous lithium chloride solution prepared by dissolving 0.07 mole of lithium chloride in 0.39 mole of $H_2O$. The temperature of the mix was maintained at 40° C. for 55 hours whereby the phenol and epichlorohydrin reacted to form the corresponding chlorohydrin ethers. The product was thereafter treated as described in Example I wherein the evaporation of the chlorohydrin was conducted at a material temperature of 150° C. under 1 mm. pressure.

The glycidyl polyether product had an epoxy equivalency of 187, a viscosity of 9600, and a color on the Gardner scale of 5. Based on the epoxy equivalency the content of monomeric glycidyl polyether was calculated as 80.3%. The remaining product comprised essentially of high molecular weight polymers. The amount of unreacted epichlorohydrin recovered was 99.6%. The heat distortion value of the product, cured with 4,4'-methylene dianiline, was 160° C. The flexural strength of the cured product was 16,900 p.s.i. at room temperature, and 8100 p.s.i. at 132° C.

What is claimed is:

1. Process for the preparation of glycidyl polyethers of polyhydric phenols which comprises reacting at temperatures below about 60° C. a mixture consisting of a polyhydric phenol, about 3 moles of epichlorohydrin per phenolic hydroxyl group, from 0.01 to 0.07 mole per phenolic hydroxyl group of a lithium compound which generates a base on reaction with epichlorohydrin and from 0.001% to 1% by weight water based on the total weight of the components in said mixture, until substantially all of said phenol has reacted with the epichlorohydrin to form the corresponding chlorohydrin ether, removing the unreacted epichlorohydrin from said chlorohydrin ether and dehydrochlorinating said chlorohydrin ether to form the corresponding glycidyl polyether.

2. Process for the preparation of glycidyl polyethers of polyhydric phenols which comprises reacting at a temperature below about 60° C. a mixture consisting of a polyhydric phenol, about 3 moles of epichlorohydrin per phenolic hydroxyl group, from 0.01 to 0.07 mole per phenolic hydroxyl group of a lithium compound selected from the group consisting of lithium chloride, lithium iodide, lithium bromide, lithium propionate, lithium butyrate, lithium acetate, lithium naphthenate, lithium oxide, and lithium hydroxide and from 0.001% to 1% by weight water based on the total weight of the components in said mixture, until substantially all of said phenol has reacted with the epichlorohydrin to form the corresponding chlorohydrin ether, removing the unreacted epichlorohydrin from said chlorohydrin ether and dehydrochlorinating said chlorohydrin ether to form the corresponding glycidyl polyether.

3. Process for the preparation of glycidyl polyethers of polyhydric phenols which comprises reacting at a temperature below about 40° C. a mixture consisting of a polyhydric phenol, about 3 moles of epichlorohydrin per phenolic hydroxyl group of said polyhydric phenol, from 0.01 to 0.07 mole of a lithium compound which generates a base on reaction with epichlorohydrin per phenolic hydroxyl group and 0.001% to 1% by weight water based on the total weight of the components in said mixture, until substantially all of said phenol has reacted with the epichlorohydrin to form the corresponding chlorohydrin ether, removing the unreacted epichlorohydrin from said chlorohydrin ether and then dehydrochlorinating said chlorohydrin ether to form the corresponding glycidyl polyether.

4. Process for the preparation of glycidyl polyethers of polyhydric phenols which comprises reacting at a temperature below about 60° C. a mixture consisting of a polyhydric phenol, about 3 moles of epichlorohydrin per phenolic hydroxyl group, from 0.01 to 0.07 mole per phenolic hydroxyl group of a lithium compound which generates a base on reaction with epichlorohydrin, and from 0.001% to 1% by weight water based on the total weight of the components in said mixture until substantially all of said phenol has reacted with the epichlorohydrin to form the corresponding chlorohydrin ether and dehydrochlorinating said chlorohydrin ether to form the corresponding glycidyl polyether by the addition thereto of an alkali metal hydroxide.

5. Process for the preparation of glycidyl polyethers of polyhydric phenols which comprises reacting at a temperature below about 60° C. a mixture consisting of a polyhydric phenol, about 3 moles of epichlorohydrin per phenolic hydroxyl group, from 0.01 to 0.07 mole per phenolic hydroxyl group of a lithium compound which generates a base on reaction with epichlorohydrin and from 0.001% to 1% by weight water based on the total weight of the components in said mixture, until substantially all of said phenol has reacted with the epichlorohydrin to form the corresponding chlorohydrin ether, removing the unreacted epichlorohydrin from said chlorohydrin ether, solvating said chlorohydrin ether with a liquid comprising a mixture of a water-soluble solvent selected from the group consisting of methanol, ethanol, isopropanol, butanol, and dioxane, and a water-insoluble solvent selected from the group consisting of toluene, xylene, and isopropyl ether, the ratio of water-soluble solvent to water-insoluble solvent ranging from about 1:1 to 3:1 by weight, and adding to said solvated chlorohydrin ether an excess of the stoichiometric amount of alkali metal hydroxide required for substantially complete dehydrochlorination, whereby said chlorohydrin ether is dehydrochlorinated to the corresponding glycidyl polyether and recovering said glycidyl polyether.

6. Process as defined in claim 1 wherein the polyhydric phenol is bis-(4-hydroxyphenyl) dimethyl methane.

7. Process as defined in claim 5 wherein the water-soluble solvent is ethanol.

8. Process as defined in claim 5 wherein the water-insoluble solvent is toluene.

9. Process as defined in claim 1 wherein the lithium compound is lithium chloride.

References Cited in the file of this patent

UNITED STATES PATENTS

| | | |
|---|---|---|
| 2,467,171 | Werner et al. | Apr. 12, 1949 |
| 2,506,486 | Bender | May 2, 1950 |
| 2,581,464 | Zech | Jan. 8, 1952 |
| 2,599,974 | Carpenter | June 10, 1952 |
| 2,682,547 | Clemens et al. | June 29, 1954 |
| 2,801,227 | Goppel | July 20, 1957 |
| 2,841,595 | Pezzaglia | July 1, 1958 |
| 2,943,095 | Farnham et al. | June 28, 1960 |